United States Patent
Squires

(10) Patent No.: US 9,888,077 B2
(45) Date of Patent: Feb. 6, 2018

(54) METADATA BASED DATA ALIGNMENT IN DATA STORAGE SYSTEMS

(71) Applicant: HGST Netherlands B.V., Amsterdam (NL)

(72) Inventor: Christopher J. Squires, Boulder, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 184 days.

(21) Appl. No.: 14/258,718

(22) Filed: Apr. 22, 2014

(65) Prior Publication Data

US 2015/0304421 A1 Oct. 22, 2015

(51) Int. Cl.
*G06F 15/16* (2006.01)
*H04L 29/08* (2006.01)
*H04L 29/06* (2006.01)

(52) U.S. Cl.
CPC ...... *H04L 67/1097* (2013.01); *H04L 65/4069* (2013.01)

(58) Field of Classification Search
CPC .................. H04L 67/1097; H04L 65/4069
USPC ........ 709/202; 711/170, 149, 154, 171, 201; 370/395.3, 389, 349, 350, 311
See application file for complete search history.

(56) References Cited

U.S. PATENT DOCUMENTS

| | | | |
|---|---|---|---|
| 5,465,340 A | 11/1995 | Tadhg et al. | |
| 5,884,055 A * | 3/1999 | Tung ..................... | G06F 9/5016 709/213 |
| 6,122,717 A * | 9/2000 | Chan ......................... | G06F 5/00 711/170 |
| 6,145,017 A | 11/2000 | Van Mil | |
| 6,434,674 B1 * | 8/2002 | DeWilde .............. | G06F 13/1673 710/52 |
| 6,622,232 B2 | 9/2003 | Schroeder | |
| 7,080,194 B1 | 7/2006 | Van Dyke | |
| 7,092,279 B1 * | 8/2006 | Sheppard ................. | G11C 7/02 257/E21.656 |
| 7,099,216 B2 | 8/2006 | Luk et al. | |
| 7,383,399 B2 | 6/2008 | Ridgway et al. | |
| 7,391,671 B2 | 6/2008 | Hopper et al. | |
| 7,765,380 B2 * | 7/2010 | Norman ................. | G11C 5/066 365/240 |
| 8,036,248 B2 | 10/2011 | Lee et al. | |
| 8,190,812 B2 | 5/2012 | Miller et al. | |
| 8,402,246 B1 | 3/2013 | Williams et al. | |

(Continued)

FOREIGN PATENT DOCUMENTS

JP 2012203767 10/2012

*Primary Examiner* — Thuong Nguyen

(57) ABSTRACT

To provide enhanced operation of data storage devices and systems, various systems, methods, and firmware are provided herein. In a first example, a data storage device is presented. The data storage device includes a network interface configured to receive a data stream for storage on a storage medium, the data stream comprising meta data that precedes payload data. The data storage device includes a processing system configured to process at least the meta data when writing the data stream from the network interface to a memory to identify a data gap for the data stream to establish a byte alignment of at least the payload data in the memory. The processing system is also configured to insert the data gap in the memory and store the data stream in the memory.

20 Claims, 5 Drawing Sheets

(56) References Cited

U.S. PATENT DOCUMENTS

| | | |
|---|---|---|
| 8,484,433 B2 | 7/2013 | Faith et al. |
| 9,444,710 B1* | 9/2016 | Lesau ................. H04L 43/0852 |
| 2002/0067745 A1* | 6/2002 | Coupe ................. H04N 21/426 370/535 |
| 2003/0018837 A1* | 1/2003 | Hussain ................. G06F 13/28 710/22 |
| 2005/0246507 A1* | 11/2005 | Busaba ............... G06F 9/30025 711/154 |
| 2005/0251642 A1* | 11/2005 | Niell ................. G06F 9/30043 711/201 |
| 2006/0133383 A1* | 6/2006 | Homer ................. H04L 12/422 370/395.3 |
| 2006/0146814 A1* | 7/2006 | Shah ................. H04L 67/1097 370/389 |
| 2006/0230329 A1* | 10/2006 | Tayler ................. G06F 11/1044 714/763 |
| 2008/0155210 A1* | 6/2008 | Taunton ............... G06F 9/30036 711/161 |
| 2008/0186946 A1* | 8/2008 | Marinier ................. H04L 49/90 370/349 |
| 2008/0273589 A1* | 11/2008 | Kim ....................... H04H 60/07 375/240.01 |
| 2009/0138672 A1* | 5/2009 | Katsuragi ............. G06F 3/0613 711/171 |
| 2010/0103923 A1* | 4/2010 | Nosley ................ H04W 72/005 370/350 |
| 2010/0185810 A1 | 7/2010 | Cline et al. |
| 2012/0206181 A1* | 8/2012 | Lin ........................ H03K 5/135 327/199 |
| 2013/0246803 A1* | 9/2013 | Vale .................... H04L 65/4084 713/189 |
| 2014/0022969 A1* | 1/2014 | Ryshakov .............. H04L 47/365 370/311 |
| 2015/0113214 A1* | 4/2015 | Sutardja ............. G06F 12/0804 711/106 |
| 2015/0304421 A1* | 10/2015 | Squires ............... H04L 65/4069 709/202 |

* cited by examiner

METADATA BASED DATA ALIGNMENT IN DATA STORAGE SYSTEMS

TECHNICAL FIELD

Aspects of the disclosure are related to the field of digital data storage systems.

TECHNICAL BACKGROUND

Computer and network systems such as personal computers, workstations, server systems, and cloud storage systems, typically include data storage systems for storing and retrieving data. These data storage systems can include data storage devices, such as hard disk drives, solid state storage devices, tape storage devices, and other mass storage devices.

These data storage systems can receive data for storage over various interfaces, such as serial and parallel data interfaces, network interfaces, and other data interfaces. In some examples of network interfaces, a file transfer protocol is used which employs more than one simultaneous data connection for transferring meta data and user data. However, in other examples, a data stream is transferred which includes both meta data and user data in one connection using a sequential bit stream.

OVERVIEW

To provide enhanced operation of data storage devices and systems, various methods, and firmware are provided herein. In a first example, a data storage device is presented. The data storage device includes a network interface configured to receive a data stream for storage on a storage medium, the data stream comprising meta data that precedes payload data. The data storage device includes a processing system configured to process at least the meta data when writing the data stream from the network interface to a memory to identify a data gap for the data stream to establish a byte alignment of at least the payload data in the memory. The processing system is also configured to insert the data gap in the memory and store the data stream in the memory.

In another example, a method of operating a data storage device is presented. The method includes receiving a data stream over a network interface for storage on a storage medium, the data stream comprising meta data that precedes payload data. When writing the data stream from the network interface to a memory prior to storage on the storage medium, the method includes processing at least the meta data to identify a data gap for the data stream to establish a byte alignment of the payload data in the memory. The method also includes inserting the data gap in the memory and storing the data stream in the memory.

In another example, a data storage system is presented. The data storage system includes a data storage enclosure that includes a plurality of data storage devices configured to receive data streams over a network and store the data streams on storage media of the plurality of data storage devices. One or more of the data storage devices are configured to receive at least one of the data streams over a network interface for storage on a storage medium, where the at least one of the data streams comprising meta data that precedes payload data, process at least the meta data when writing the at least one of the data streams from the network interface to a memory to identify a data gap for the at least one of the data streams to establish a byte alignment of the payload data in the memory, and insert the data gap in the memory and store the at least one of the data streams in the memory.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Data storage systems can receive data for storage over various interfaces, such as serial and parallel data interfaces, network interfaces, and other data interfaces. In some examples of network interfaces, a file transfer protocol (FTP) is used which employs more than one simultaneous data connection for transferring meta data and user data. In other examples, a data stream is transferred which includes both meta data and user data in one connection using a sequential bit stream.

When multiple simultaneous data connections are employed, data alignment by a data storage system can be achieved by separately storing data received over each connection, ensuring alignment of user data during storage. However, when a single connection is employed, such as in examples of data streams that include both header or meta data and user data in a payload portion, alignment of the data during storage can be troublesome.

Figure 1:
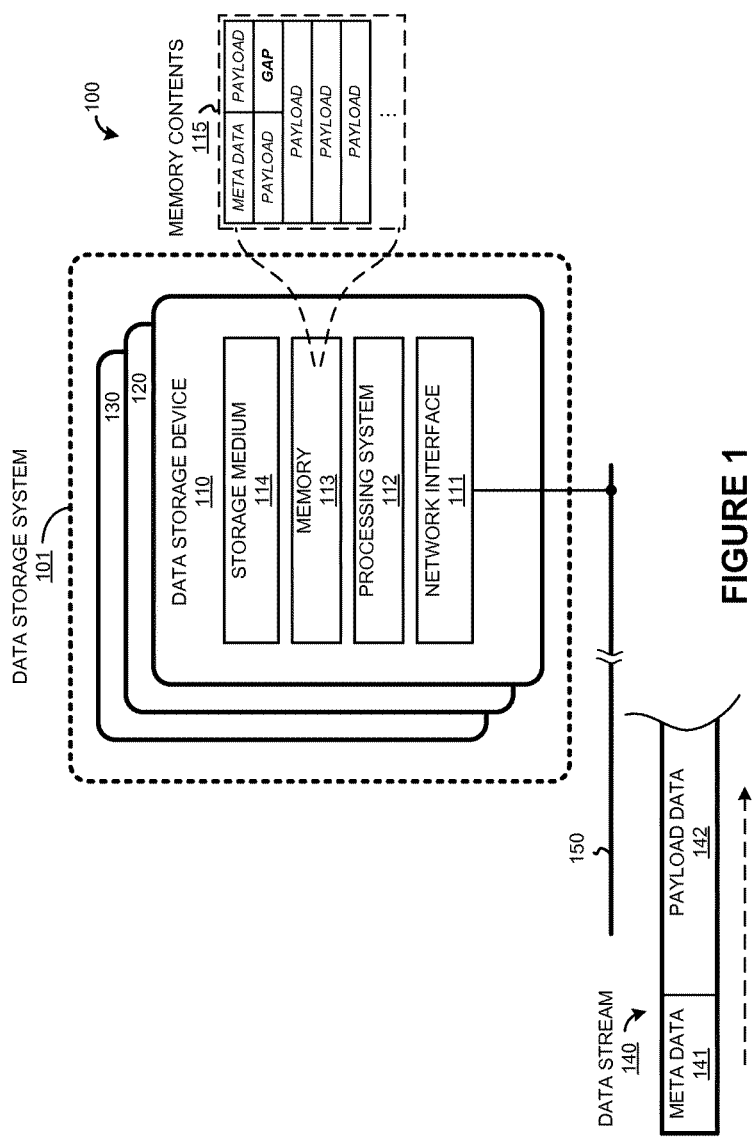
FIG. 1 is a system diagram illustrating a data system.

As a first example, FIG. 1 is presented. FIG. 1 is a system diagram illustrating data system 100. System 100 includes data storage system 101 which further includes data storage devices 110, 120, and 130. Data storage device 110 communicates over network link 150. Data storage devices 120 and 130 can communicate over further network links, not shown in FIG. 1 for clarity.

Data storage device 110 includes network interface 111, processing system 112, memory 113, and storage medium 114. Data storage devices 120 and 130 include similar elements. The elements of data storage device 110 are communicatively coupled and allow for exchange of data. In operation, data can be received by network interface 111 over network link 150 for storage in storage medium 114 of data storage device 110. Data received by network interface 111 is stored in memory 113 before storage in storage medium 114.

Figure 2:
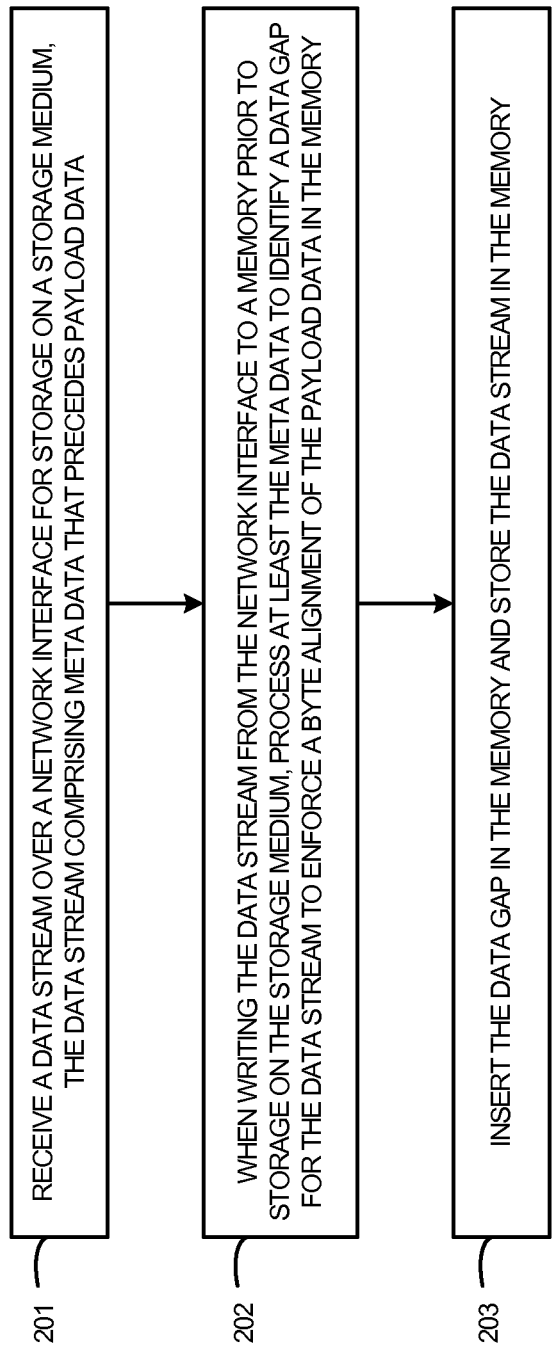
FIG. 2 is a flow diagram illustrating a method of operation of a data storage system.

To further illustrate the operation of system 100, FIG. 2 is presented. FIG. 2 is a flow diagram illustrating a method of operation of data storage system 101. The elements of FIG. 2 are referenced below parenthetically. In FIG. 2, data storage device 110 receives (201) a data stream over network interface 111 for storage on storage medium 114, the data stream comprising meta data that precedes payload data. In this example, data stream 140 is received over network link 150 by network interface 111.

Data stream 140 includes meta data portion 141 and payload data portion 142. Meta data 141 can include headers, addresses, attributes, or other information for data stream 140. Payload data 142 can include user data, payload information, content, or other data for storage by data storage device 110. In this example, meta data 141 and payload data 142 are received sequentially in data stream 140.

When writing the data stream from network interface 111 to memory 113 prior to storage on storage medium 114, processing system 112 processes (202) at least meta data 141 to identify a data gap for data stream 140 to enforce a byte alignment of at least payload data 142 in memory 113. As data stream 140 is received, network interface 111 transfers data stream 140 for storage in memory 113.

As shown in memory contents 115 in FIG. 1, meta data 141 and payload data 142 are stored in memory 113 as received in data stream 140. However, since meta data 141 takes up a certain amount of space in memory 113 before payload data 142, then payload data 142 will not be in any particular byte alignment in memory 113. This non-byte alignment of payload data 142 can lead to performance slowdowns when transferring payload data 142 to storage medium 114. In many examples, storage medium 114 has a preferred byte alignment for data stored thereon. For example, a byte alignment can be preferred due to a storage scheme for writing bits to storage medium 113. In other examples, the byte alignment can be preferred due to an error checking and correction scheme used when writing bits to storage medium 113.

Processing system 112 inserts (203) the data gap in memory 113 and stores data stream 140 in memory 113. When data is written to storage medium 113 in a non-aligned manner, then a re-alignment process typically occurs for all of payload data 142 after storage in memory 113, which can lead to performance slowdowns and wasted processing time. In non-aligned examples, once all of data stream 140 is written to memory 113, then a read-write process must occur for at least all of payload data 142 to align payload data 142 prior to transfer to storage medium 114. Advantageously, in this example, the alignment is determined during writing of data stream 140, and a large portion of payload data 142 is aligned during writing of data stream 140 into memory 113.

In further examples, a portion of the data in memory 113 remains unaligned, such as a portion of payload data 142 written prior to identifying the data gap. This portion can be re-aligned by a small amount of read-writes to align in memory 113. In some examples, meta data 141 is not re-aligned, and only payload 142 is re-aligned.

Returning back to the elements of FIG. 1, data storage system 101 comprises a plurality of data storage devices, namely data storage device 110, 120, and 130. Further data storage devices can be included. Data storage system 101 can include an enclosure, such as a rack mount system, case, shelving, and the like, for structurally supporting data storage systems. Furthermore, data storage system 101 can include network links, network switches or hubs, cabling, power systems, and other equipment to interconnect ones of the data storage devices to at least network link 150. Data storage system 101 can also include cooling systems, fans, battery backup systems, and other equipment to provide a suitable operating environment for data storage devices.

Data storage devices 110, 120, and 130 each include equipment and circuitry to receive data over a network interface for storage on a storage medium. In this example, data storage device 110 is representative of data storage devices 120 and 130, although variations are possible.

Data storage device 110 includes network interface 111, processing system 112, memory 113, and storage medium 114. Network interface 111 includes network transceiver equipment, such as physical layer interfacing equipment, amplifiers, filters, network interface card equipment, and other networking interface elements to communicate over network link 150. Processing system 112 includes one or more microprocessors, or discrete circuitry devices to identify data gaps for aligning data and for writing data to memory 113. In some examples, processing system 112 comprises a Transmission Control Protocol Offload Engine (TOE) module, which receives data from network interface 111 and transfers this data for buffering in memory 113. When processing system 112 comprises a TOE, further processing elements can be included in processing system 112, such as Linux-based processing element which assists TOE circuitry. Memory 113 comprises non-transitory, volatile or non-volatile, solid state memory, such as dynamic random access memory (DRAM), static RAM, phase change memory, flash memory, and the like. Storage medium 114 comprises one or more non-volatile non-transitory storage media. Example of storage medium 114 include rotating magnetic storage media, magnetic tape media, phase change memory media, flash memory media, or other media.

In some examples of data storage device 111, network interface 111, processing system 112, and memory 113 are included in a system-on-a-chip (SOC) device, which control the operations of storage medium 114. Data storage device 111 can include an enclosure around storage medium 114 to protect storage medium 114 from environmental effects, such as a hard drive enclosure, while network interface 111, processing system 112, memory 113, and other elements, reside on a printed circuit board attached to the enclosure.

Network link 150 uses metal, glass, optical, air, space, or some other material as the transport media. Network link 150 can use various communication protocols, such as Ethernet, Internet Protocol (IP), Time Division Multiplex (TDM), asynchronous transfer mode (ATM), synchronous optical networking (SONET), hybrid fiber-coax (HFC), Universal Serial Bus (USB), serial attached SCSI (SAS), Fibre Channel, communication signaling, wireless communications, or some other communication format, including combinations, improvements, or variations thereof. Network link 150 can be a direct link or can include intermediate networks, systems, or devices, and can include a logical network link transported over multiple physical links. Network link 150 can include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

Figure 3:
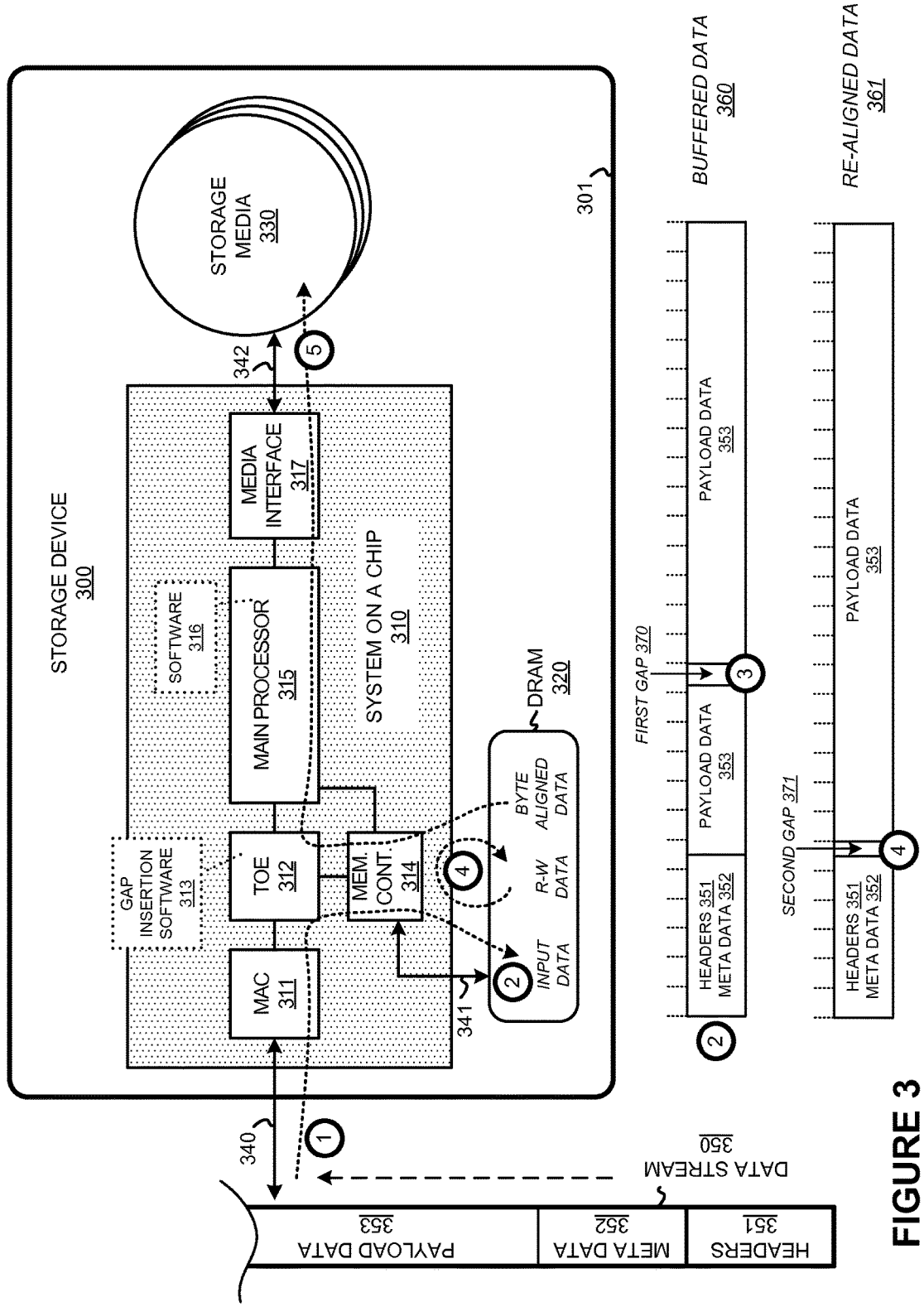
FIG. 3 is a block diagram illustrating a data storage device.

As another example of a data storage device, FIG. 3 is presented. FIG. 3 is a block diagram illustrating data storage device 300. Data storage device 300 can be an example of data storage device 110 of FIG. 1, although variations are possible. In FIG. 3, data stream 350 is received over network link 340 for storage on storage media 330 by data storage device 300. Network link 340 can be a wired or wireless Ethernet link and include Internet protocol (IP) traffic, or include elements described for network link 150 of FIG. 1.

Data storage device 300 includes system-on-a-chip (SOC) 310, dynamic random access memory (DRAM) 320, and rotating magnetic storage media 330. Data storage device 300 can include enclosure 301 which can enclose or structurally support ones of the elements of data storage device 300. Data storage device 300 can optionally include additional devices, features, or functionality not discussed here for purposes of brevity.

SOC 310 includes media access control (MAC) element 311, Transmission Control Protocol Offload Engine (TOE) module 312, memory controller 314, main processor 315, and media interface 317 integrated onto a single semiconductor die, or one or more semiconductor dies packaged into a single chip package. In further examples, multiple chip packages can be employed. In operation, the elements of SOC 310 are communicatively coupled, such as by intra-chip interconnect. It should be understood that discrete links can be employed, such as individual communication, power, and control links or other circuitry. SOC 310 can be distributed or consolidated among equipment or circuitry that together forms the elements of SOC 310.

MAC 311 includes medium access control circuitry and logic, such as link layer elements for handling network traffic over link 340. In some examples, MAC 311 includes elements of a physical layer interface (PHY), while some elements of a PHY can be included externally to SOC 310. Further examples of MAC 311 include logic, transmission gates, buffers, network interface card equipment, transceivers, and other communication circuitry. MAC 311 interfaces with at least TOE 312 for handling of data packets received over network link 340.

TOE 312 includes circuitry and logic for offloading processing of packet header information for network traffic received by MAC 311. This packet header information can include TCP, IP, or NFS packet headers, among others. TOE includes processing circuitry to buffer or store these packets in DRAM 320 by way of memory controller 314. In the examples herein, TOE 312 can identify data alignment issues for data stored in DRAM. TOE 312 can identify byte mis-alignments due to meta data or header data of data streams during storage of the data storage in DRAM 320. TOE 312 can identify one or more gaps for a data stream to byte align the storage of the data stream in DRAM 320. Further processing elements can be included in TOE 312 or accompany TOE 312, such as Linux-based processing elements which assists TOE circuitry.

TOE 312 can comprise one or more microprocessors, microcontrollers, application specific integrated circuit (ASIC) processors, or FPGA elements and other circuitry that retrieves and executes at least gap insertion software 313 to operate as described herein. TOE 312 can be implemented within a single processing device but can also be distributed across multiple processing devices or sub-systems that cooperate in executing program instructions. Examples of TOE 312 include general purpose central processing units, application specific processors, and logic devices, as well as any other type of processing device, combinations, or variations thereof.

TOE 312 can include a storage system that includes software 313, the storage system is omitted from FIG. 3 for clarity, but can be included in SOC 310 or TOE 312. The storage system can include any non-transitory computer readable storage media readable by TOE 312 and capable of storing software 313, such as a computer readable storage device. The computer readable storage media that stores software 313 can include volatile and nonvolatile, removable and non-removable media implemented in any method or technology for storage of information, such as computer readable instructions, data structures, program modules, or other data. In addition to storage media, in some implementations the computer readable storage media can also include communication media over which software 313 can be communicated. The computer readable storage media that stores software 313 can be implemented as a single storage device but can also be implemented across multiple storage devices or sub-systems co-located or distributed relative to each other. The computer readable storage media that stores software 313 can comprise additional elements, such as a controller, capable of communicating with TOE 312. Examples of storage media include random access memory, read only memory, flash memory, or any other medium which can be used to store the desired information and that can be accessed by an instruction execution system, as well as any combination or variation thereof, or any other type of storage media.

Software 313 can be implemented in program instructions and among other functions can, when executed by storage device 301 in general or TOE 312 in particular, direct storage device 301 or TOE 312 to write data associated with data streams into DRAM 320, identify byte alignment issues during the storage of data streams in DRAM 320, and identify data gaps to align data streams during storage in DRAM 320, among other operations. Software 313 can include additional processes, programs, or components, such as operating system software, database software, or application software. Software 313 can also comprise some other form of machine-readable processing instructions executable by TOE 312.

In general, software 313 can, when loaded into TOE 312 and executed, transform TOE 312 overall from a general-purpose computing system into a special-purpose computing system customized to operate as described herein. Encoding software 313 on a computer readable storage media can transform the physical structure of the computer readable storage media. The specific transformation of the physical structure can depend on various factors in different implementations of this description. Examples of such factors can include, but are not limited to the technology used to implement the storage media of the computer readable storage media and whether the computer readable storage media are characterized as primary or secondary storage. For example, if the computer-storage media are implemented as semiconductor-based memory, software 313 can transform the physical state of the semiconductor memory when the program is encoded therein. For example, software 313 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Memory controller 314 includes circuitry and communication interfaces for communicating with DRAM 320. Memory control 314 communicates over memory link 314 to write data into DRAM 320 and read data stored in DRAM 320. Memory link 314 can include serial or parallel data interfaces, such as synchronous DRAM (SDRAM) or double date rate SDRAM (DDR) memory interfaces.

Main processor 315 can comprise one or more microprocessors, microcontrollers, application specific integrated circuit (ASIC) processors, or FPGA elements and other circuitry that retrieves and executes at least gap insertion software 316 to operate as described herein. Main processor 315 can be implemented within a single processing device but can also be distributed across multiple processing devices or sub-systems that cooperate in executing program instructions. Examples of main processor 315 include general purpose central processing units, application specific processors, and logic devices, as well as any other type of processing device, combinations, or variations thereof.

Main processor 315 can include a storage system that includes software 316, the storage system is omitted from FIG. 3 for clarity, but can be included in SOC 310 or main processor 315. The storage system can include any non-transitory computer readable storage media readable by main processor 315 and capable of storing software 316, such as a computer readable storage device. The computer readable storage media that stores software 316 can include volatile and nonvolatile, removable and non-removable media implemented in any method or technology for storage of information, such as computer readable instructions, data structures, program modules, or other data. In addition to storage media, in some implementations the computer readable storage media can also include communication media over which software 316 can be communicated. The computer readable storage media that stores software 316 can be implemented as a single storage device but can also be implemented across multiple storage devices or sub-systems co-located or distributed relative to each other. The computer readable storage media that stores software 316 can comprise additional elements, such as a controller, capable of communicating with main processor 315. Examples of storage media include random access memory, read only memory, flash memory, or any other medium which can be used to store the desired information and that can be accessed by an instruction execution system, as well as any combination or variation thereof, or any other type of storage media.

Software 316 can be implemented in program instructions and among other functions can, when executed by storage device 301 in general or main processor 315 in particular, direct storage device 301 or main processor 315 to read data stored in DRAM 320, transfer the data for storage in storage media 330, read and write data on storage media 330, and transfer data stored on storage media 330 for delivery over network link 340, among other operations. Software 316 can include additional processes, programs, or components, such as operating system software, database software, or application software. Software 316 can also comprise some other form of machine-readable processing instructions executable by main processor 315.

In general, software 316 can, when loaded into main processor 315 and executed, transform main processor 315 overall from a general-purpose computing system into a special-purpose computing system customized to operate as described herein. Encoding software 316 on a computer readable storage media can transform the physical structure of the computer readable storage media. The specific transformation of the physical structure can depend on various factors in different implementations of this description. Examples of such factors can include, but are not limited to, the technology used to implement the storage media of the computer readable storage media and whether the computer readable storage media are characterized as primary or secondary storage. For example, if the computer-storage media are implemented as semiconductor-based memory, software 316 can transform the physical state of the semiconductor memory when the program is encoded therein.

For example, software 316 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Media interface 317 includes circuitry, devices, and equipment for transferring write data to storage media 330 and reading data from storage media 330. In examples of rotating magnetic media, such as hard disk drives, media interface 317 can comprise signal processing circuitry, read channel circuitry, servo control systems, channel seek/track systems, write circuitry, step-up voltage converters, buffers, line amplifiers, and other circuitry and equipment.

DRAM 320 comprises volatile solid state memory. DRAM can instead include any non-transitory solid state memory, including phase change, flash memory, magnetic random access memory, and the like. DRAM 320 interfaces with SOC 310 using a signaling interface, such as employed by SDRAM, DDR, or other memory interface technologies.

Storage media 330 comprises magnetic storage media. Storage media 330 also can include servo/armatures, motors, spindles, platters, and read/write heads. The elements shown in FIG. 3 for magnetic storage media portion 330 are merely representative of a rotating magnetic media system and associated mechanisms, other elements are omitted for clarity.

Figure 4:
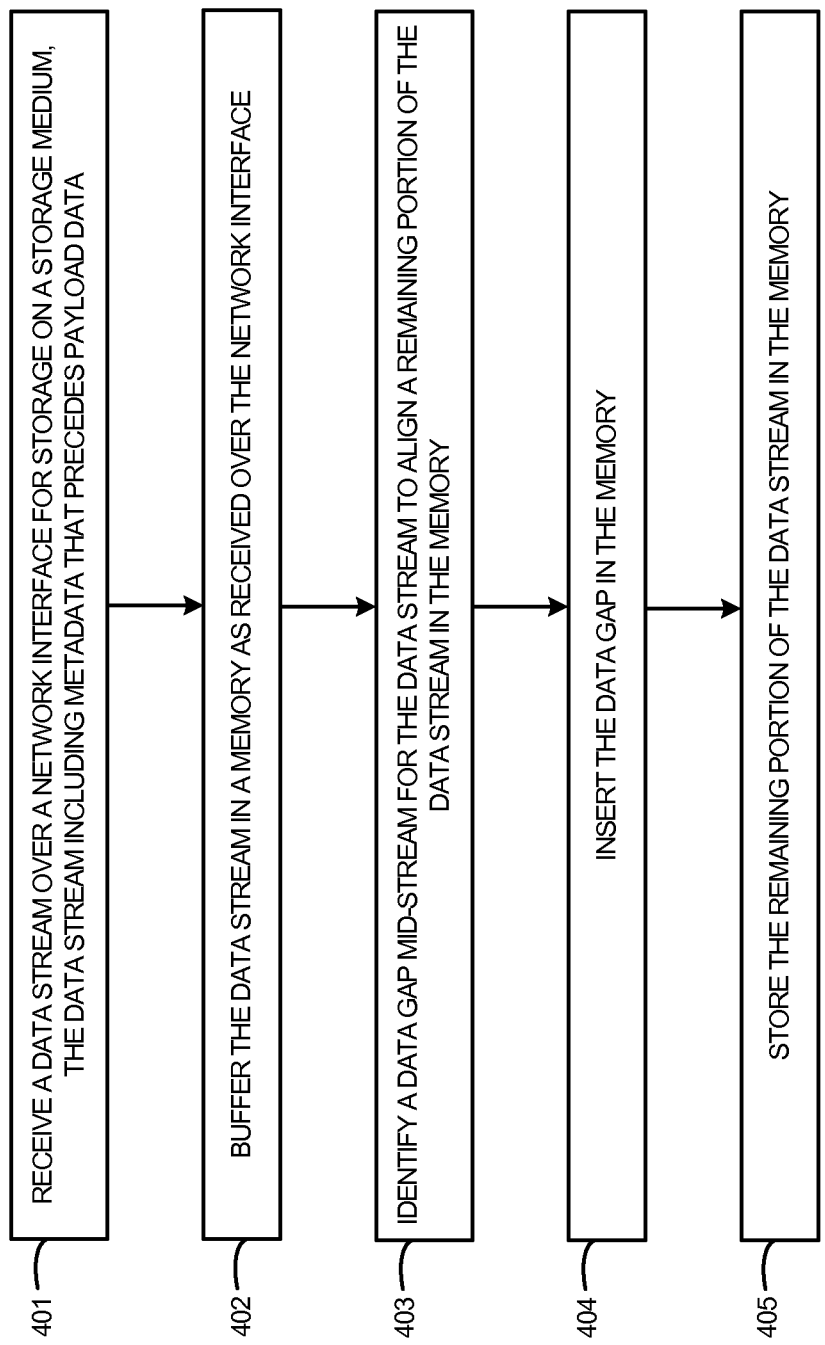
FIG. 4 is a flow diagram illustrating a method of operation of a data storage device.

FIG. 4 is a flow diagram illustrating a method of operation of data storage device 300. The operations of FIG. 4 are referenced below parenthetically. Although TOE 312 is discussed in FIG. 4 as performing the processing below, it should be understood that main processor 315 can instead handle some of the processing discussed. Moreover, further processing elements can be included in TOE 312 or accompany TOE 312, such as Linux-based processing elements which assist TOE circuitry in the processing discussed below.

In FIG. 4, storage device 300 receives (401) data stream 350 over network interface 340 for storage on a storage medium, data stream 350 including metadata that precedes payload data. Data stream 350 is received over network link 340 by MAC 311 in storage device 300. MAC 311 passes data stream 350 to TOE 312 for packet processing and buffering of data stream 350 in DRAM 320. Operation 401 can be illustrated by step "1" in FIG. 3.

Data stream 350 can include one or more headers 351, meta data 352, and payload data 353. In some examples, data stream 350 comprises a network file system (NFS) packet or packets, although any network file handling system can be employed. Header information 351 can include IP, Ethernet, or NFS headers and associated information. Meta data 352 can include file information, information describing the data included in payload 353, data attributes, storage addresses, or other information associated with payload data 353. Payload data 353 includes user data or other data to be written to storage media 330 by storage device 300.

Storage device 300 buffers (402) data stream 350 in memory as received over network interface 340. In this example, TOE 312 processes one or more headers 351 to determine properties of data stream 350, such as identifying a packet type, packet size, packet format, destination and source addresses, and the like. TOE 312 buffers headers 351, meta data 352, and payload data 353 in DRAM 320. Input data is received into DRAM 320 over memory interface 341.

Memory controller 314 handles this input data received from TOE 312 to physically interface with DRAM 320. This buffering process can be seen in FIG. 3 as indicated by step "2," and includes the portion of buffered data 360 until first gap 370. In some examples, only a portion of the header and meta data is buffered.

Storage device 300 identifies (403) data gap 370 midstream for data stream 350 to align a remaining portion of data stream 350 in the memory. As seen in FIG. 3, small dashed lines above "buffered data 360" indicate byte alignments for one example byte alignment. Headers 351 and meta data 352 do not align with a byte alignment during storage in DRAM 320, and once payload data 353 is written into DRAM 320, this payload data is also not aligned with the byte alignment. However, during the writing process of data stream 350 into DRAM 320, TOE 312 identifies this misalignment between the stored data in DRAM 320 and the desired byte alignment. This misalignment can be identified by identifying a size of the stored header and meta data and determining how many bits out of alignment the payload data is during storage. In this example, first data gap 370 is identified. This data gap process can be seen in FIG. 3 as indicated by step "3."

The desired alignment can be based upon different factors. The byte alignment is selected in part based on storage media 330. The desired alignment can be based upon a physical subdivision of storage blocks of the storage media, or upon error checking or correction bits employed on the storage media. This is in contrast to a storage block subdivision of DRAM 320 or an error checking scheme of DRAM 320.

In examples of rotating magnetic storage, a physical disk can be subdivided into storage blocks, and the storage block size can be used to establish the byte alignment. The storage block size can be a sector size in some examples. In example of flash media, a block size can be different than magnetic media, and a different byte alignment can be established. For example, the byte alignment for flash media can be a page size. The byte alignment eases transfer of data from DRAM 320 to storage media 330 by avoiding an additional step of realigning all of the data stored in DRAM 320 before transfer to storage media 330. In the examples discussed herein, the data alignment is done mid-stream while writing data stream 350 into DRAM 320.

In some examples, an error checking or error checking and correction (ECC) scheme is employed for storage media 330. This error checking scheme can include one or more bytes for a piece of stored user data that indicate error checking bits or error correction bits, such as parity bits, ECC bits, and the like. The number of user data bits that correspond to a particular bit or bits of the error checking bits can vary based on a desired scheme, or based on the physical media itself. In examples of rotating magnetic storage, a physical disk can be subdivided into storage blocks, and each storage block can have a corresponding number of ECC bits. Various ratios of user data bits to ECC bits can be employed. The data alignment of data stored in DRAM 320 can be selected based on the error checking scheme, so that a piece of user data and the associated error checking bits fit into a block size of the physical media of storage media 330.

Once data gap 370 has been identified, storage device 300 inserts (404) data gap 370 in the memory. In this example, TOE 312 inserts data gap 370 in DRAM 320 by leaving a portion of the memory unwritten to during the current write process for data stream 350. In some examples, blank or placeholder data can be inserted as data gap 370 and the writing of data stream 350 can be paused during the writing of data gap 370.

Once data gap 370 has been inserted, then writing of data stream 350 can continue, and storage device 300 stores (405) the remaining portion of data stream 350 in the memory. In this example TOE 312 inserts data gap 370 and then continues buffering payload data 353 of data stream 350 in DRAM 320. After all of the payload data of data stream 350 has been written into DRAM 320, then the portion of data stream 350 written after data gap 370 is aligned according to the desired byte alignment in DRAM 320.

Figure 5:
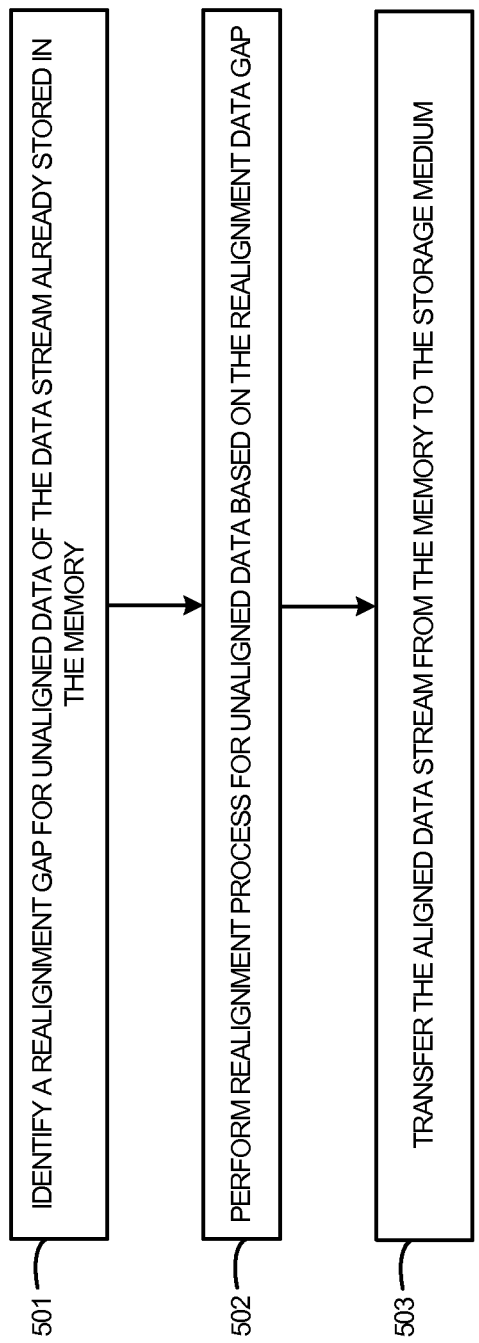
FIG. 5 is a flow diagram illustrating a method of operation of a data storage device.

To handle the initially written data in DRAM 320 that was not aligned in DRAM 320, further realignment can proceed. FIG. 5 is a flow diagram illustrating a method of operation of data storage device 300 which includes re-alignment process. In FIG. 5, storage device 300 identifies (501) a realignment gap for unaligned data of the data stream already stored in the memory. For example, in buffered data 360, a first portion of payload data 353 remains unaligned, in contrast to a second portion of payload data 353. The amount of mis-alignment of the first portion of payload data 353 is determined, based in part on a difference in storage end position for headers 351 and meta data 352 and first gap 370. In FIG. 3, the realignment gap is indicated by second data gap 371, and step "4."

Storage device 300 performs (502) a realignment process for unaligned data based on the realignment data gap. A read-write process can be performed by TOE 312 to read the unaligned portion of payload data 353 from DRAM 320 and insert second gap 371 in DRAM 320. Once the first portion of payload data 353 is re-written back into DRAM 320, then this first portion of payload data 353 will be aligned along with the second portion of payload data 353. This re-aligned data can be seen in "re-aligned data 361" in FIG. 3, and the realignment process can include step "4" in FIG. 3. In some examples, a portion of payload data 353 will remain unaligned due to too little data remaining to fit in an aligned manner into an alignment position in DRAM 320. In further examples, a selected portion of headers 351 or meta data 352 can also be aligned in DRAM 320 using the re-alignment process in step "4" of FIG. 3.

Storage device 300 transfers (503) the aligned data stream from the memory to storage media 330. In this example, once the desired portions of data stream 350 are aligned in DRAM 320, then storage device 300 can transfer this aligned data from DRAM 320 for storage in storage media 330. This operation can be seen as step "5" in FIG. 3. In some examples, main processor 315 handles the transfer of data in DRAM 320 to storage media 330, with storage media 330 physically interfaced by media interface 317. Once stored on storage media 330, data can be retrieved at a later time by storage device 300 and transferred over network link 340.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A data storage device, comprising:
a network interface configured to receive a data stream for storage on a non-transitory storage medium, the data stream comprising meta data that precedes payload data; and
a processing system configured to:
store the meta data and an initial portion of the payload data in a memory without byte alignment;
process the data stream to identify a data gap, for insertion after the initial portion of the payload data, configured to establish a byte alignment of a remaining portion of the payload data in the memory;
store the remaining portion of the payload data in the memory separated from the initial portion of the payload data by the data gap to byte align the remaining portion of the payload data in the memory;
calculate a realignment gap, based on a storage end position of the meta data and based on the data gap, configured to establish a byte alignment of the initial portion of the payload data in the memory;
after storing the remaining portion of the payload data, align the initial portion of the payload data in the memory based on a separation of the initial portion of the payload data from the meta data by the realignment gap to byte align the initial portion of the payload data in the memory; and
after alignment of the initial portion, transfer the meta data and all of the aligned payload data to the non-transitory storage medium from the memory.

2. The data storage device of claim 1, wherein the processing system is further configured to realign the initial portion of the payload data based on the byte alignment in the memory for the initial portion of the payload data.

3. The data storage device of claim 1, wherein the byte alignment comprises a byte alignment of a data storage scheme of the non-transitory storage medium.

4. The data storage device of claim 1, wherein the byte alignment comprises a byte alignment of an error checking scheme of the non-transitory storage medium.

5. The data storage device of claim 1, wherein the processing system comprises a Transmission Control Protocol Offload Engine (TOE).

6. The data storage device of claim 1, wherein the memory comprises a dynamic random access memory.

7. The data storage device of claim 1, wherein the non-transitory storage medium comprises a rotating magnetic storage medium.

8. A processor configured to:
receive a data stream over a network interface for storage on a non-transitory storage medium, the data stream comprising meta data that precedes payload data;
store the meta data and an initial portion of the payload data without byte alignment in a memory prior to storage on the non-transitory storage medium;
when storing the data stream from the network interface in the memory, process at least the meta data to identify a data gap for the data stream to establish a byte alignment of a remaining portion of the payload data in the memory;
store the remaining portion of the payload data in the memory separated from the initial portion of the payload data by the data gap;
calculate a realignment gap for the initial portion of the payload data that was stored in the memory without byte alignment after storing the remaining portion of the payload data based on a storage end position of the meta data and based on the data gap;
align the initial portion of the payload data based on a separation of the initial portion of the payload data from the meta data by the realignment gap; and
responsive to alignment of the initial portion of the payload data, transfer the meta data and all of the payload data to the non-transitory storage medium from the memory.

9. The processor of claim 8, wherein the byte alignment comprises a byte alignment of a data storage scheme of the non-transitory storage medium.

10. The processor of claim 8, wherein the byte alignment comprises a byte alignment of an error checking scheme of the non-transitory storage medium.

11. The processor of claim 8, wherein the processor comprises a Transmission Control Protocol Offload Engine (TOE).

12. The processor of claim 8, wherein the processor, in being configured to store the meta data and the initial portion of the payload data without byte alignment in the memory, is configured to store the meta data and the initial portion of the payload data without byte alignment in a dynamic random access memory.

13. The processor of claim 8, wherein the processor, in being configured to transfer the meta data and all of the payload data to the non-transitory storage medium from the memory, is configured to transfer the meta data and all of the payload data to a non-transitory rotating magnetic storage medium from the memory.

14. The processor of claim 8, wherein the processor, in being configured to receive the data stream over the network interface, is configured to receive the data stream via a medium access control circuitry.

15. A data storage system, comprising:
a data storage enclosure that includes a plurality of data storage devices configured to receive data streams over a network and store the data streams on storage media of the plurality of data storage devices;
wherein one or more of the data storage devices is further configured to:
receive at least one of the data streams over a network interface for storage on a non-transitory storage medium, the at least one of the data streams comprising meta data that precedes payload data;
write the meta data and an initial portion of the payload data without byte alignment to a memory;
process at least the meta data during at least a portion of writing the meta data and the initial portion of the payload data to the memory to identify a data gap for a remaining portion of the payload data of the at least one of the data streams;
insert the data gap in the memory after the initial portion of the payload data and store the remaining portion of the payload data in the memory after the data gap to establish a byte alignment of the remaining portion of the payload data in the memory;
calculate a realignment gap for the initial portion of the payload data that was written without byte alignment in the memory based on a storage end position of the meta data and based on the data gap;
align the initial portion of the payload data in the memory based on a separation of the initial portion of the payload data from the meta data by the realignment gap to establish a byte alignment of the initial portion of the payload data in the memory; and write at least the payload data in arranged respective byte alignments to the non-transitory storage medium from the memory.

16. The data storage system of claim 15, wherein each of the byte alignment of the initial portion of the payload data and the byte alignment of the remaining portion of the payload data comprises a byte alignment of a data storage scheme of the non-transitory storage medium.

17. The data storage system of claim 15, wherein each of the byte alignment of the initial portion of the payload data and the byte alignment of the remaining portion of the payload data comprises a byte alignment of an error checking scheme of the non-transitory storage medium.

18. The data storage system of claim 15, wherein the one or more of the data storage devices, in being configured to write the meta data and the initial portion of the payload data without byte alignment the memory, is configured to write the meta data and the initial portion of the payload data without byte alignment to a dynamic random access memory.

19. The data storage system of claim 15, wherein the one or more of the data storage devices, in being configured to write at least the payload data in arranged respective byte alignments to the non-transitory storage medium from the memory, is configured to write at least the payload data in arranged respective byte alignments to a non-transitory rotating magnetic storage medium from the memory.

20. The data storage system of claim 15, wherein the one or more of the data storage devices, in being configured to receive at least one of the data streams over the network interface, is configured to receive at least one of the data streams via a medium access control circuitry.

\* \* \* \* \*